(12) United States Patent
Inoue

(10) Patent No.: US 7,173,522 B2
(45) Date of Patent: Feb. 6, 2007

(54) SEATBELT REMINDER SYSTEM

(75) Inventor: Takashi Inoue, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/926,989

(22) Filed: Aug. 27, 2004

(65) Prior Publication Data

US 2005/0045403 A1  Mar. 3, 2005

(30) Foreign Application Priority Data

Aug. 29, 2003 (JP) ............................. 2003-307449

(51) Int. Cl.
*B60Q 1/00* (2006.01)
(52) U.S. Cl. .................. 340/457; 340/457.1; 340/463; 340/667; 701/1; 701/35
(58) Field of Classification Search ................ 340/457, 340/457.1, 463, 464, 466, 438, 425.5, 667, 340/461, 459; 280/801.1, 804; 297/468, 297/479; 701/1, 36, 45
See application file for complete search history.

(56) References Cited

U.S. PATENT DOCUMENTS

| | | | | |
|---|---|---|---|---|
| 4,585,251 A | * | 4/1986 | Yoshitsugu et al. | 280/804 |
| 4,747,616 A | * | 5/1988 | Burris | 280/807 |
| 5,483,221 A | * | 1/1996 | Mutter et al. | 340/457.1 |
| 6,278,358 B1 | | 8/2001 | Spoto et al. | |
| 6,501,374 B1 | * | 12/2002 | King et al. | 340/457.1 |

FOREIGN PATENT DOCUMENTS

DE  101 54 005 A1  8/2002

* cited by examiner

*Primary Examiner*—Daniel Wu
*Assistant Examiner*—Daniel Previl
(74) *Attorney, Agent, or Firm*—Birch, Stewart, Kolasch & Birch, LLP

(57) ABSTRACT

A seatbelt reminder system warns a crew member when the crew member has not fastened a seatbelt. The system makes a way of giving a reminder different between a case (S302, S303, or S304) where the running state of a vehicle is detected when the unfastened state of the seatbelt is detected and a case (S310, S311, or S312) where the unfastened state of the seatbelt is detected when the running state of the vehicle is detected.

9 Claims, 4 Drawing Sheets

SEATBELT REMINDER SYSTEM

CROSS-REFERENCE TO A RELATED APPLICATION

This application claims the priority of Japanese Patent Application No. 2003-307449, which is incorporated herein by reference.

BACKGROUND OF THE INVENTION

1. Field of the Invention

The present invention relates to a seatbelt reminder system, and, more particularly, to a seatbelt reminder system which changes a reminder method according to a situation.

2. Description of the Related Art

In general, seatbelts in a vehicle are capable of fastening the bodies of crew members to their seats. Accordingly, a seatbelt reminder system is used to avoid the unfastened state of each seatbelt as much as possible.

The system employs different reminder schemes, such as a visual warning to visually notify the unfastened state of the seatbelt to a crew member by means of, for example, lighting of an indicator, and an acoustic warning to give acoustic notification to the crew member by giving a buzzer sound.

The technique of the system is described in, for example, U.S. Pat. No. 6,278,358.

The system is activated upon separately detecting the fastening state of a seatbelt (hereinafter referred to as "seat-belt fastening state" whenever convenient) and the running state of the vehicle, and warns crew members. This technique can cope with the unfastened state of the seatbelt after the engine is set running.

The prior art technique does not however distinguish a reminder method in a case where the running state of a vehicle is detected when the unfastened state of a seatbelt is detected from a reminder method in a case where the unfastened state of the seatbelt is detected when the running state of the vehicle is detected.

In the case where the unfastened state of a seatbelt is detected when a vehicle is in the running state, the crew member on that seat is very likely to be aware that the seatbelt is not fastened compared with the case where the running state of a vehicle is detected when a seatbelt is in the unfastened state. A reminder if given in that state would annoy the crew member considerably. In other words, no particular measures against such probable annoyance given to crew members have been taken into consideration in the prior art technology.

The seatbelt reminder system should take definition of re-reminding conditions into consideration in addition to the requirement that a reminder should be generated immediately when a seatbelt is apparently unfastened at the time a vehicle starts running.

That is, if, after completion of one cycle of warning comprised of a first reminder and a second reminder, the second reminder is started again without defining a re-reminding condition when a reminding condition on the running state of the vehicle or the unfastened state of the seatbelt is satisfied again, the reminder becomes tedious, giving rather considerable annoyance to the associated crew member. What is more, defining no re-reminding condition would urge the crew member to take an action of fastening the unfastened seatbelt even during driving at a high speed, which is dangerous.

SUMMARY OF THE INVENTION

Accordingly, it is an object of the present invention to provide a seatbelt reminder system capable of reducing annoyance to a crew member.

To achieve the object, according to the present invention, there is provided a seatbelt reminder system which warns a crew member when the crew member has not fastened a seatbelt and comprises a seat-belt fastening detecting element which detects a fastening state of the seatbelt; a running-state detecting element which detects a running state of a vehicle; and a reminder element which gives a reminder when an unfastened state of the seatbelt and the running state of the vehicle are detected from results of detection by the seat-belt fastening detecting element and the running-state detecting element, and makes a way of giving the reminder different between a case where the running state of the vehicle is detected when the unfastened state of the seatbelt is detected and a case where the unfastened state of the seatbelt is detected when the running state of the vehicle is detected.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 4 is a timing chart for reminder control which is executed by the seatbelt reminder system in FIG. 1.

DETAILED DESCRIPTION OF THE INVENTION

An embodiment of the present invention will be described below referring to the accompanying drawings.

Figure 1:
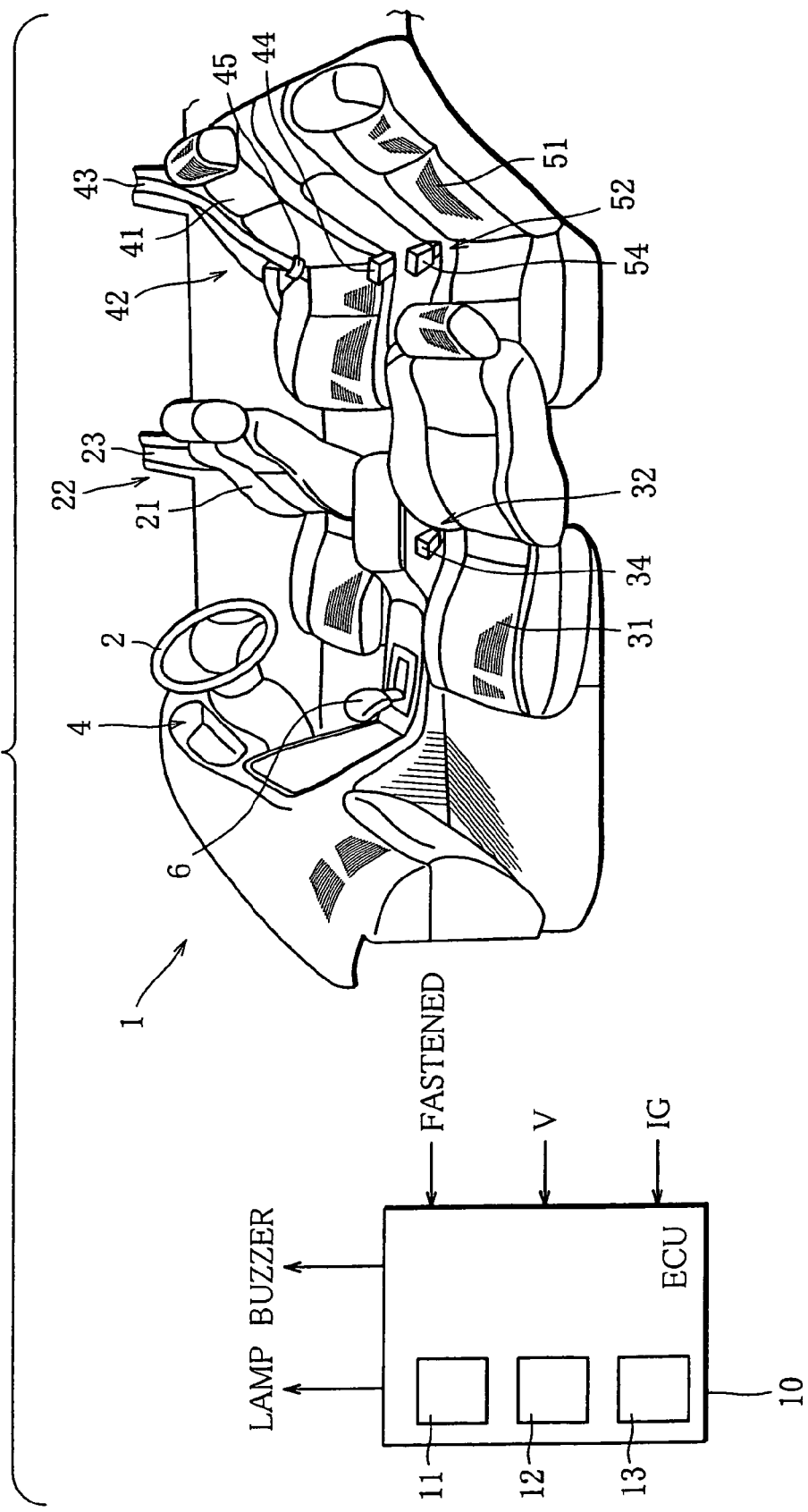
FIG. 1 is a diagram showing the internal structure of a vehicle to which a seatbelt reminder system according to one embodiment of the present invention is adapted.

FIG. 1 illustrates the internal structure of a vehicle 1 to which a seatbelt reminder system according to the present invention is adapted.

The vehicle 1 is a four-seater vehicle. The vehicle 1 has four occupants' seats, that is, a driver's seat 21, a front passenger seat 31, a right rear passenger seat 41, and a left rear passenger seat 51. A steering wheel 2, a display panel 4 and an unillustrated ignition switch (IG1) are provided at the proper positions in front of the driver seat 21. The steering wheel 2 manipulates the driving direction of the vehicle 1. The display panel 4 displays various statuses of the vehicle 1. The ON/OFF action of the IG1 changes between the engine active state and the engine inactive state. A shift lever 6 is provided at the proper position between the driver seat 21 and the navigator seat 31 to change the shift position.

The driver seat 21, the front passenger seat 31, and the right and left rear passenger seats 41 and 51 are provided with seatbelts 22, 32, 42 and 52, respectively. When fastened, the seatbelts holds the bodies of occupants in their respective seats.

The seatbelts 22, 32, 42 and 52 used in this embodiment are each a three-point lap and diagonal seatbelt which is adapted to hold the waist and upper part of the occupant's body. The seatbelts 22, 32, 42 and 52 are constituted by identical parts; that is, each seatbelt comprises webbing, a buckle, a latch plate, a fixture, and a webbing retractor. The webbing is a single continuous belt serving both as waist webbing and shoulder webbing. The buckle is detachably connected with the latch plate through which the webbing is passed and by means of which the length of the webbing is adjusted. Each seatbelt is attached to the vehicle by the fixture.

The seatbelt is fastened as the latch plate is coupled to the buckle, and the fastened state is input to an electronic control unit (ECU) 10. The ECU 10 also receives various kinds of signals on the vehicle speed of the vehicle 1, the transmission range position of the shift lever 6 and so forth.

In the seatbelt reminder system of this embodiment, the ECU 10 has a seat-belt fastening detector (seat-belt fastening detecting element) 11, a running-state detector (running-state detecting element) 12 and a reminder indicator (reminder element) 13.

The detector 11 electrically converts signals indicating if the buckles of the seatbelts 22, 32, 42 and 52 are connected to the latch plates to detect the fastened state and unfastened state of the seatbelt for each of the seats 21, 31, 41 and 51, and sends the detection result to the reminder indicator 13. Specifically, with the seatbelt fastened, a seatbelt switch $BELT_{SW}$ is set OFF, whereas with the seatbelt unfastened, the seatbelt switch $BELT_{SW}$ is set ON.

The detector 12 electrically converts a signal from an unillustrated speed sensor to detect the vehicle speed of the vehicle 1. This makes it possible to define the halt state of the vehicle 1 as a state from, for example, the point where the vehicle speed V is 0 km/h (0 mph) to a point where the vehicle speed V reaches $V_S$ (about 3 km/h (about 2 mph)) and define the running state of the vehicle 1 when the vehicle speed V exceeds $V_M$ (about 8 km/h (about 5 mph)). The detector 12 then sends the signal on each state to the reminder indicator 13.

In accordance with the results of detection from the detector 11 and the detector 12, the reminder indicator 13 in the embodiment sends each driving signals to a visual warning device and an auditory warning device to notify the occupants of the unfastened states of the seatbelts by lighting a lamp and sounding a buzzer. To avoid the unfastened state of the seatbelt as much as possible, the reminder indicator 13 informs each crew member of the unfastened state of the seatbelt.

Specifically, to light the lamp for about 60 seconds and buzz for about 6 seconds when the seatbelt is not fastened with the IG1 set ON, and a second reminder to repeat light ON of the lamp and buzzing for A seconds and light OFF of the lamp and stopping buzzing for B (<A) seconds about N times are defined and are carried out. The pattern of light ON for A seconds is to execute C times of a rectangular pattern of light ON for a seconds and light OFF for β (>α) seconds, whereas the pattern of buzzing for A seconds is to execute C times of a rectangular pattern of light ON for α/3 seconds, light OFF for α/3 seconds, light ON for α/3 seconds and light OFF for β seconds.

The reminder indicator 13 makes the reminder method different between a case where the running state of the vehicle 1 is detected when the unfastened state of the seatbelt is detected and a case where the unfastened state of the seatbelt is detected when the running state of the vehicle 1 is detected. That is, the start of the reminder in the latter case where the unfastened state of the seatbelt is detected when the running state of the vehicle 1 is detected is delayed by a period Te from the start of the reminder in the former case where the running state of the vehicle 1 is detected when the unfastened state of the seatbelt is detected. The period Te is changed according to the individual occupants' seats.

The reminder indicator 13 enables re-reminding when halting of the vehicle 1 is detected after the second reminder is ended, and gives a reminder again when the unfastened state of the seatbelt and the running state of the vehicle 1 are detected after the halting state of the vehicle 1 is detected upon completion of the second reminder.

The reminder indicator 13 in this embodiment enhances the contents of the reminder in the former case where the running state of the vehicle 1 is detected when the unfastened state of the seatbelt is detected as compared with those in the latter case where the unfastened state of the seatbelt is detected when the running state of the vehicle 1 is detected.

Figure 2:
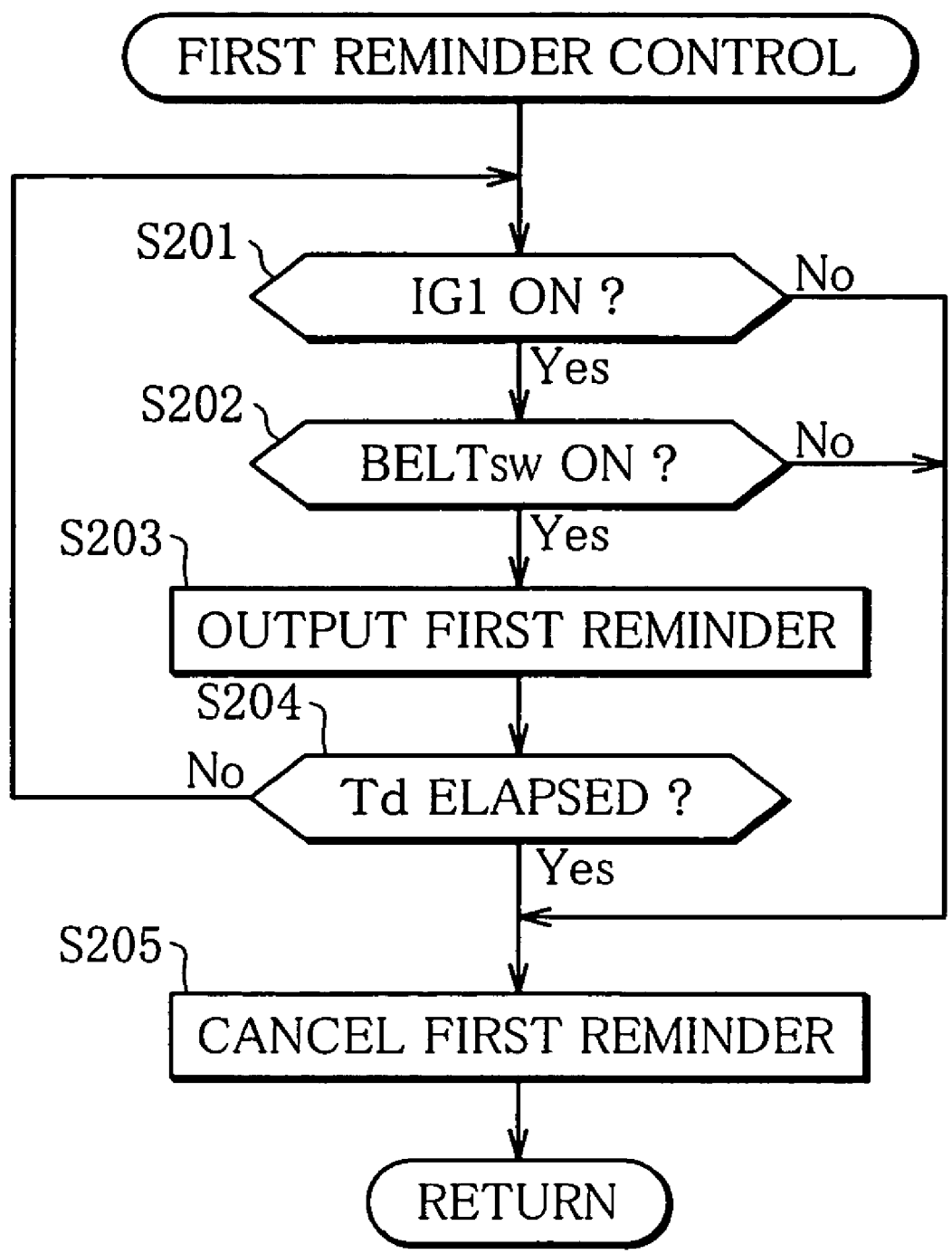
FIG. 2 is a flowchart for first reminder control which is executed by the seatbelt reminder system in FIG. 1.
Figure 3:
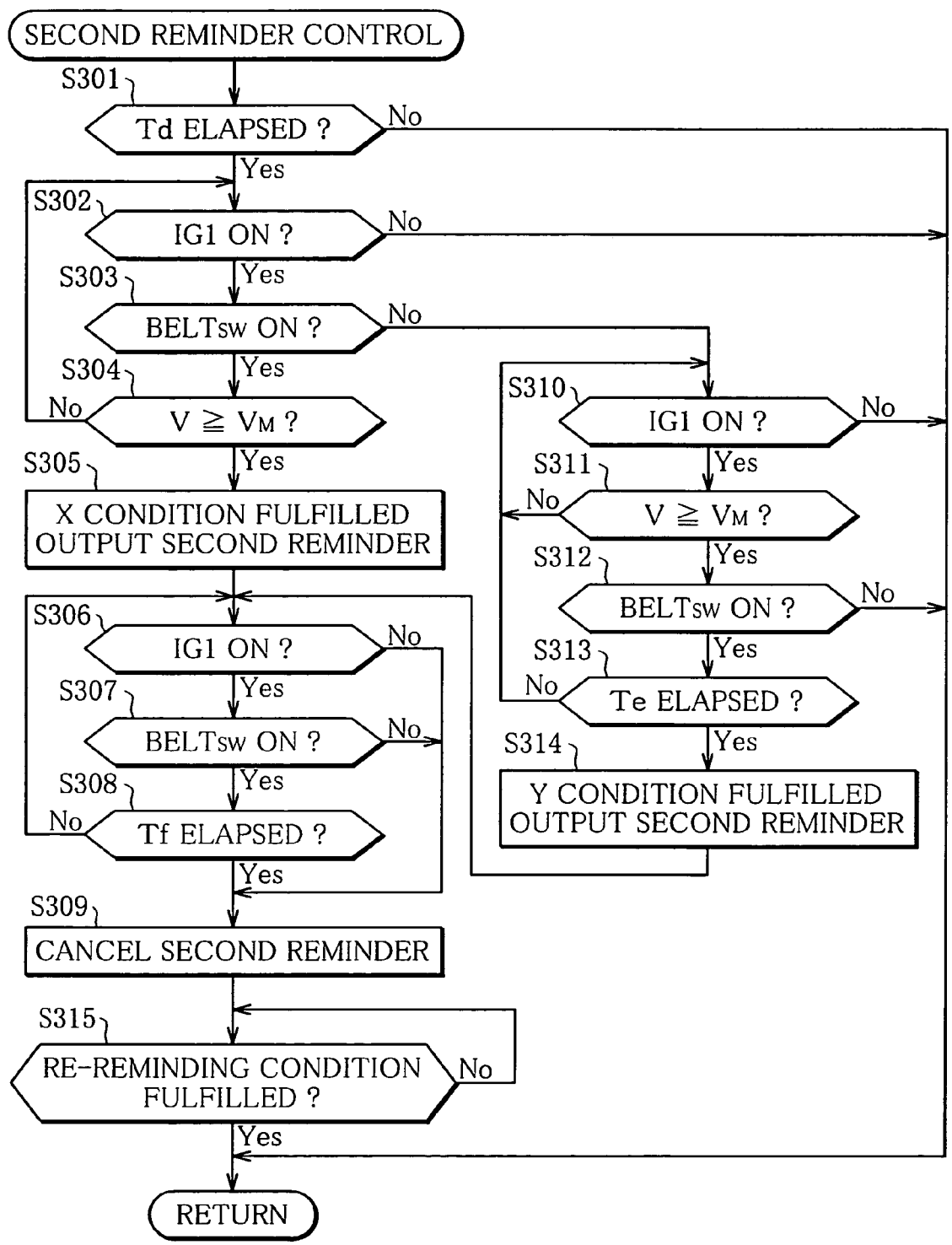
FIG. 3 is a flowchart for second reminder control which is executed by the seatbelt reminder system in FIG. 1.

FIGS. 2 and 3 illustrate flowcharts for first reminder control and second reminder control which are executed by the seatbelt reminder system. The following will discuss the operation of the seatbelt reminder system according to the present invention which has the above-described structure.

At step S201 in FIG. 2, it is determined whether the IG1 is ON or not. When the engine is active, i.e., the decision at the step is YES, the flow goes to step S202 where the seat-belt fastening detector 11 determines whether the seatbelt switch $BELT_{SW}$ is ON or not. When the seatbelt is not fastened, i.e., when the decision is YES, the flow goes to step S203.

When the IG1 is OFF at step S201 or when the seat belt switch $BELT_{SW}$ is OFF at step S202, the flow goes to step S205 to cancel the first reminder after which the flow leaves the routine.

At step S203, the reminder indicator 13 outputs a drive signal for the first reminder. FIG. 4 shows a timing chart for reminder control. As illustrated in the diagram, in the case where the seatbelt switch $BELT_{SW}$ is ON when the IG1 is ON, a buzzer sound is generated for approximately 6 seconds. Although FIG. 4 shows only the generation of the reminder by means of the buzzer, the lamp is turned on as well. Specifically, the flow goes to step S204 to turn on the lamp to inform the unfastened state of the seatbelt until a first reminder period Td of about 60 seconds elapses. When it is determined that the period Td has elapsed, the flow goes to step S205 to end the first reminder after which the flow leaves the routine.

Then, at step S301 in FIG. 3, it is determined whether the first reminder period Td has elapsed. When it is determined that about 60 seconds have elapsed since the IG1 was set ON, the flow goes to step S302.

At step S302, it is determined whether the IG1 is ON or not. When the engine is active, i.e., the decision at the step is YES, the flow goes to step S303 where the seat-belt fastening detector 11 determines whether the seatbelt switch $BELT_{SW}$ is ON or not. When the seatbelt is not fastened, i.e., when the decision is YES, the flow goes to step S304.

At step S304, the detector 12 determines whether the vehicle speed V exceeds $V_M$ or not. When the vehicle speed V exceeds $V_M$, i.e., when the decision is YES, the flow goes to step S305 where the reminder indicator 13 identifies a condition X being satisfied and outputs a drive signal for the second reminder. That is, in the case where the IG1 is ON and the seatbelt switch $BELT_{SW}$ is ON after the first reminder is ended upon elapsing of Td as shown in FIG. 4, when the vehicle speed V exceeds $V_M$, the second reminder to repeat buzzing for A seconds and stopping buzzing for B seconds is given until a period Tf elapses (until buzzing and stopping buzzing are repeated N times) to notify the crew member of that even promptly. Flickering of the lamp which is achieved by the light ON of the lamp for A seconds and the light OFF of the lamp for B seconds is repeated N times.

When it is determined at step S306 that the IG1 is OFF or at step S307 that the seatbelt switch $BELT_{SW}$ is OFF, the flow goes to step S309 to stop outputting the second reminder and cancel the second reminder. When it is determined at step S308 that Tf has elapsed, the flow goes to step S309 to end the second reminder too.

Thereafter, the reminder indicator 13 determines at step S315 whether re-reminding condition is satisfied or not. When the vehicle speed V becomes $V_S$ or lower, i.e., when the decision is YES, the flow leaves the routine.

When it is determined at step S303 that the seatbelt is fastened, the flow goes to step S310 to determine whether the IG1 is ON or not. When it is determined that the engine is active, the flow goes to step S311 where the detector 12 determines whether or not the vehicle speed V is greater than $V_M$. When the vehicle speed V is greater than $V_M$, i.e., when the decision is YES, the flow goes to step S312 where the detector 11 determines whether the seatbelt switch $BELT_{SW}$ is ON or not. When the seatbelt is unfastened, i.e., when the decision is YES, the flow goes to step S313.

At step S313, it is determined whether a delay period Te for initiation of the second reminder has elapsed or not. When the delay period Te has elapsed, i.e., when the decision is YES, the flow goes to step S314 where the reminder indicator 13 identifies a condition Y being satisfied and outputs a drive signal for the second reminder. That is, when the seatbelt switch $BELT_{SW}$ becomes OFF, but when the seatbelt switch $BELT_{SW}$ is set ON thereafter in the case where the IG1 is ON and the vehicle speed V exceeds $V_M$, the crew member is not notified of that event promptly and the second reminder to repeat buzzing for A seconds and stopping buzzing for B seconds is executed after the passage of the period Te until the period Tf elapses (buzzing and stopping buzzing are repeated N times), as shown in FIG. 4. Flickering of the lamp which is achieved by the light ON of the lamp for A seconds and the light OFF of the lamp for B seconds is repeated N times after the period Te elapses.

When it is determined that the IG1 is OFF at step S306 or that the seatbelt switch $BELT_{SW}$ is OFF at step S307, the flow goes rapidly to step S309 to stop outputting the second reminder and cancel the second reminder. When it is determined at step S308 that Tf has elapsed, the flow goes to step S309 to immediately end the second reminder too. The second reminder is continued until it is determined at step S308 that Tf has elapsed, after which the flow goes to step S309, and when the vehicle speed V becomes $V_s$ or lower and the reminder indicator 13 determines that the re-reminding condition is satisfied, the flow leaves the routine.

When it is determined at step S302 or step S310 that the IG1 is OFF or at step S312 that the seatbelt switch $BELT_{SW}$ is OFF, the flow leaves the routine. When it is determined at step S304 or S311 that the vehicle speed V is not greater than $V_M$, the flow returns to step S302 or step S310, respectively.

Referring to the timing chart for reminder control in FIG. 4, after the first reminder ends, the second reminder with the condition X met is output, after which the second reminder with the condition Y met is output. If the condition Y is met before the condition X is met, however, the second reminder with the condition Y met is output after the first reminder ends.

According to this embodiment, as apparent from the above, conditions for visual warning and acoustic warning are ordered. In other words, only when the seatbelt switch $BELT_{SW}$ becomes ON with the vehicle speed V of the vehicle 1 exceeding $V_M$, the timing for starting reminder is delayed by the period Te. The suppression of generation of an unnecessary reminder can reduce annoyance to be given to a crew member.

When the vehicle speed V of the vehicle 1 exceeds $V_M$ while the switch $BELT_{SW}$ is ON, a reminder is generated immediately without any delay period, so that the crew member can be urged to promptly buckle the seatbelt.

As the re-reminding condition is satisfied when the vehicle 1 is halted, fastening of the seatbelt can be urged without endangering the crew member.

Although the timing for starting reminder is delayed by the period Te when the seatbelt switch $BELT_{SW}$ is ON with the vehicle speed V of the vehicle 1 being greater than $V_M$ in the embodiment, the delay period may be changed according to the initiation of the reminder. Specifically, the delay period for the driver's seat may be set shorter than the delay period for the front passenger seat, and the delay period for the rear passenger seats may be set longer than the delay period for the driver's seat or the front passenger seat.

The structure of the embodiment delays the timing for starting reminder by the period Te when the seatbelt switch $BELT_{SW}$ is ON with the vehicle speed V of the vehicle 1 being greater than $V_M$, as different from the timing for the reminder method when the vehicle speed V of the vehicle 1 exceeds $V_M$ with the switch $BELT_{SW}$ being ON. As a modification to change the reminder method, the volume of the buzzer may be set smaller or the number of times the lamp flickers is set smaller for the case where the seatbelt switch $BELT_{SW}$ is ON with the vehicle speed V of the vehicle 1 exceeding $V_M$ than the buzzer volume for the case where when the vehicle speed V of the vehicle 1 exceeds $V_M$ with the switch $BELT_{SW}$ being ON. Even in this case, annoyance of reminder a crew member feels can be reduced when the seatbelt is unfastened while driving the vehicle, and enhanced reminder can be carried out when the crew member drives the vehicle with the seatbelt unfastened. This can urge the crew member to buckle the seatbelt more adequately. In this case, the delay period need not be provided.

The re-reminding condition set by the reminder indicator 13 in the embodiment, for example, may be set at the point where the unfastened state of the seatbelt is changed to the fastened state besides the halting state of the vehicle 1. In this case, referring to FIG. 4, when the seatbelt switch $BELT_{SW}$ is set OFF to cancel the second reminder after which the IG1 is set ON and the switch $BELT_{SW}$ is set ON with the vehicle speed V exceeding $V_M$, the second reminder is executed after the period Te elapses. In this case, as in the previous case, annoyance to be given to a crew member can be reduced. The re-reminding condition may be selected by a user. The user may freely select the length of the delay period Te.

The running-condition detector 12 may detect the running state of the vehicle 1 besides the vehicle speed according to the state where the shift lever 6 is at the drive range position or the state where the transmission gear position is at the forward driving gear position, depending on the type of the vehicle.

Further, the structure of the seatbelt is not limited to a 3-point belt but a 2-point seat belt which restrains only the waist of a crew member, for example, or the webbing which has the waist webbing and the shoulder webbing constructed separately may be adequately used according to the position of the seat of interest.

Although the reminder indicator 13 in the embodiment repeats the light-ON state of the lamp for A seconds and the light-OFF state for B seconds as the second reminder N times, the reminder indicator 13 can also be adapted to a new reminder system which keeps lighting the lamp on in place of the light-OFF state for B seconds. In this case, the reminder ability can be maintained.

What is claimed is:

1. A seatbelt reminder system for outputting a reminder for an occupant when the occupant leaves a seatbelt unfastened, comprising:
   a seat-belt fastening detecting element which detects a fastened state of said seatbelt;
   a running-state detecting element which detects a running state of a vehicle; and
   a reminder element which gives a reminder when an unfastened state of said seatbelt and said running state of said vehicle are detected from results of detection by said seat-belt fastening detecting element and said running-state detecting element, and makes a way of giving said reminder different between a case where said running state of said vehicle is detected while said unfastened state of said seatbelt is being detected and a case where said unfastened state of said seatbelt is detected while said running state of said vehicle is being detected,
   wherein said reminder element delays start of said reminder for a predetermined period of time from a time when the detected fastened state of said seatbelt changes from a fastened state to said unfastened state while said running state of said vehicle is being detected as compared with that in said case where said running state of said vehicle is detected while said unfastened state of said seatbelt is being detected.

2. The seatbelt reminder system according to claim 1, wherein said reminder element makes delay of start of said reminder different according to occupant's seats.

3. The seatbelt reminder system according to claim 2, wherein a period of delaying start of said reminder for a driver's seat is set smaller than a period of delaying start of said reminder for other occupant's seats.

4. The seatbelt reminder system according to claim 1, wherein said running-state detecting element detects said running state of said vehicle according to at least one of a vehicle speed, a transmission gear position and a transmission range position.

5. The seat belt reminder system according to claim 1, wherein said reminder element enables re-reminding when halting of said vehicle is detected after said reminder is ended, and gives a reminder when said unfastened state of said seatbelt and said running state of said vehicle are detected.

6. A seatbelt reminder system for outputting a reminder for an occupant when the occupant leaves a seatbelt unfastened, comprising:
   a seat-belt fastening detecting element which detects a fastened state of said seatbelt;
   a running-state detecting element which detects a running state of a vehicle; and
   a reminder element which gives a reminder when an unfastened state of said seatbelt and said running state of said vehicle are detected from results of detection by said seat-belt fastening detecting element and said running-state detecting element, and makes a way of giving said reminder different between a case where said running state of said vehicle is detected when said unfastened state of said seatbelt is detected and a case where said unfastened state of said seatbelt is detected when said running state of said vehicle is detected,
   wherein said reminder element enhances contents of said reminder in said case where said running state of said vehicle is detected when said unfastened state of said seatbelt is detected as compared with those in said case where said unfastened state of said seatbelt is detected when said running state of said vehicle is detected.

7. A seatbelt reminder method for outputting a reminder for an occupant when the occupant leaves a seat belt unfastened, comprising:
   detecting a fastened state of said seatbelt;
   detecting a running state of a vehicle;
   giving a reminder when an unfastened state of said seatbelt and said running state of said vehicle are detected; and
   making a way of giving said reminder different between a case where said running state of said vehicle is detected while said unfastened state of said seatbelt is being detected and a case where said unfastened state of said seatbelt is detected while said running state of said vehicle is being detected,
   wherein said making step includes the step of delaying start of said reminder for a predetermined period of time from a time when the detected fastened state of said seatbelt changes from a fastened state to said unfastened state while said running state of said vehicle is being detected as compared with that in said case where said running state of said vehicle is detected while said unfastened state of said seatbelt is being detected.

8. The seatbelt reminder method according to claim 7, wherein delay of start of said reminder is made different according to occupant's seats.

9. The seatbelt reminder system according to claim 7, wherein contents of said reminder are enhanced in said case where said running state of said vehicle is detected when said unfastened state of said seatbelt is detected as compared with those in said case where said unfastened state of said seatbelt is detected when said running state of said vehicle is detected.

* * * * *